P. BRANDT.
LIQUID SPRAYING DEVICE.
APPLICATION FILED JAN. 3, 1911.
1,011,404.
Patented Dec. 12, 1911.
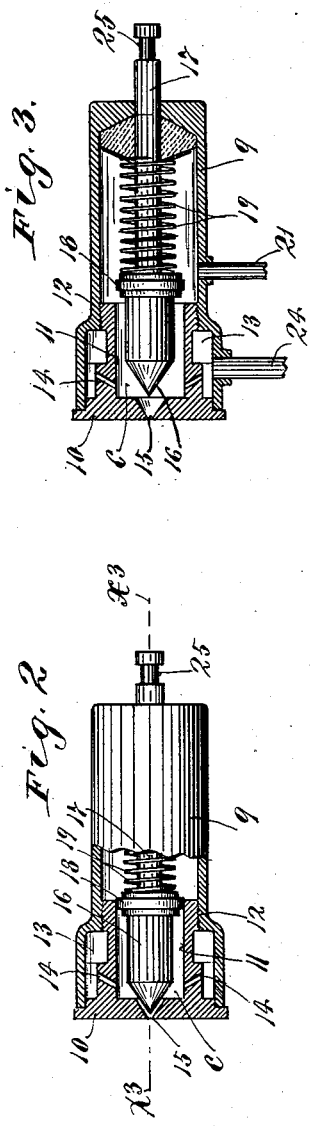
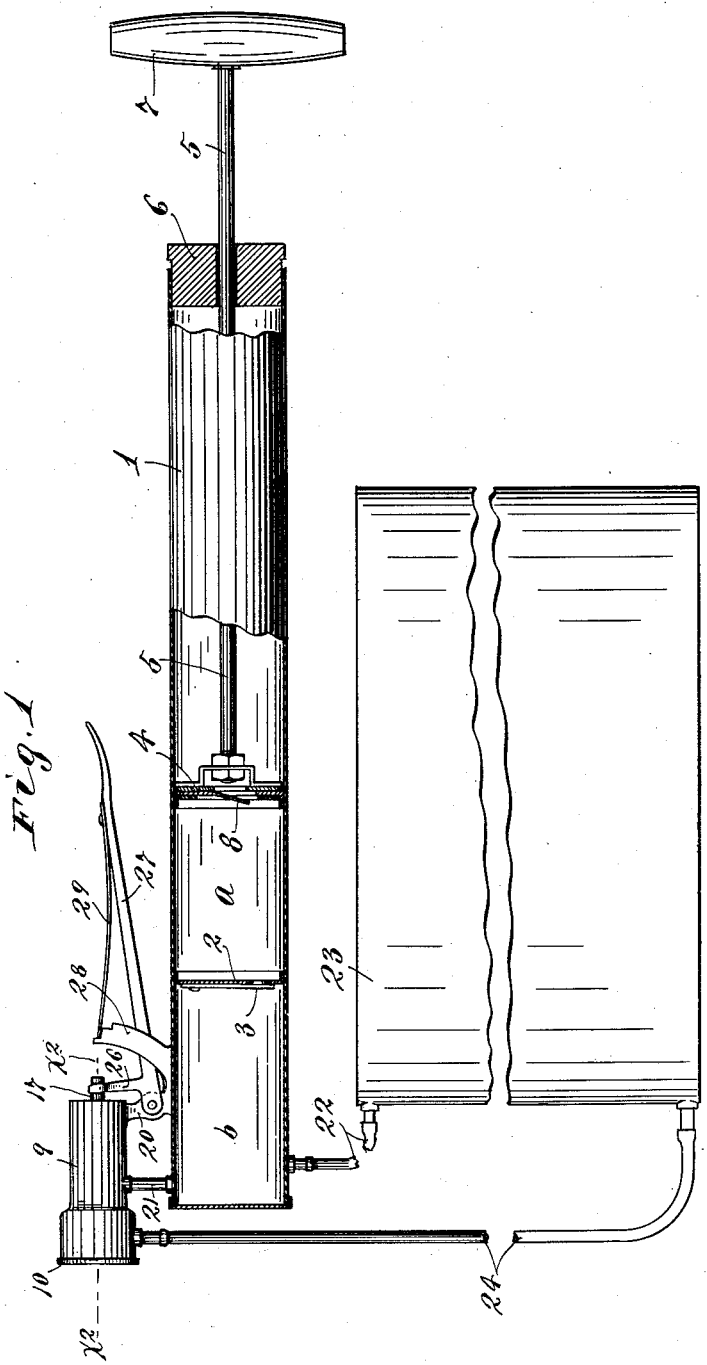
Witnesses.
A. H. Opsahl.
Harry Opsahl.
Inventor
Peter Brandt
By his Attorneys
Williamson Merchant

UNITED STATES PATENT OFFICE.

PETER BRANDT, OF CHISAGO CITY, MINNESOTA.

LIQUID-SPRAYING DEVICE.

1,011,404.  Specification of Letters Patent.  Patented Dec. 12, 1911.

Application filed January 3, 1911. Serial No. 600,447.

*To all whom it may concern:*

Be it known that I, PETER BRANDT, a citizen of the United States, residing at Chisago City, in the county of Chisago and State of Minnesota, have invented certain new and useful Improvements in Liquid - Spraying Devices; and I do hereby declare the following to be a full, clear, and exact description of the invention, such as will enable others skilled in the art to which it appertains to make and use the same.

My invention has for its object to provide an improved spraying device adapted for general use to spray liquids, but especially adapted for use to distribute germicide or fungus destroying liquids on trees, plants and various kinds of vegetation.

The invention consists of the novel devices and combinations of devices hereinafter described and defined in the claims.

In the accompanying drawings which illustrate the invention, like characters indicate like parts throughout the several views.

Referring to the drawings, Figure 1 is a view partly in side elevation and partly in vertical section, showing the improved spraying device, some parts being broken away; Fig. 2 is a horizontal section taken on the line $x^2$ $x^2$ of Fig. 1, showing the improved spraying head, some parts being shown in full; and Fig. 3 is a vertical section taken on the line $x^3$ $x^3$ of Fig. 2 and illustrating a different position of the valve of the spraying head.

It may be here stated that the improved spraying head has a valve mechanism of such construction and arrangement and is so connected to the air supply pump and liquid tank that, when the valve is set in one position, the liquid will be discharged from the tank through the nozzle of the spraying head simply by the force of air pressing against the same in the tank, but when said valve is set in another position, the liquid will be discharged from the spraying nozzle both by the pressure of the air in the tank and by a blast of air which is commingled therewith in the spraying head and discharged therewith from the spraying nozzle.

The pump cylinder or barrel 1 is provided with a partition 2 located a considerable distance from its extreme delivery end and provided with a one-way valve 3 which permits air to be delivered from the main or piston chamber $a$ of the barrel into the air storage chamber $b$ of the said barrel. Working within the barrel chamber $a$ is a piston 4 having a stem 5 which, as shown, works with clearance through a plug 6 applied to the other end of the barrel. At its outer end, the valve stem 5 is shown as provided with a hand piece 7. The piston 4 is provided with a one-way valve 8 which permits air to be drawn from the receiving to the delivery side of the piston. The air will be drawn into the barrel through the passage in the plug 6, through which the piston stem 5 works.

The spraying head, as shown, is made up of an approximately cylindrical valve casing 9 and a spraying cap 10, which latter has a cylindrical portion 11 telescoped into the casing 9 and connected thereto by threaded engagement at 12. The front end of the casing 9 is increased in diameter, so that an annular liquid chamber 13 is formed between the same and the cylindrical portion 11 of the cap 10. A plurality of liquid passages 14 connect the chamber 13 to the chamber $c$ which is formed within the cylindrical portion 11 of the said cap. The cap 10 is formed with a central discharge passage 15 which causes the said cap to serve as a spraying nozzle. Preferably, the discharge passage 15 is made conical and flares inward, so that it affords a valve seat for the conical end of an endwise movable controlling valve 16. This controlling valve 16 is provided with a stem 17 which works outward through a stuffing box in the rear end of the casing 9. As a matter of fact, the valve 16 constitutes what may be herein designated as the primary member of a multiplex controlling valve, the secondary member of which is preferably in the form of a piston valve 18 placed on the valve stem 17 and pressed against the inner extremity of the valve 16 by a coiled spring 19 which re-acts against the rear end of the casing 9, and normally holds the secondary valve 18 seated within the cylindrical portion 11 of the spraying cap or nozzle 10 and the conical end of the primary valve 16 seated in the discharge passage 15.

The spraying head described is preferably rigidly secured to the delivery end of the pump barrel 1, by a small strut or bracket 20 and by an air delivery tube 21, which latter connects the chamber $b$ of the pump barrel with the interior of the casing 9. The chamber $b$ of the said pump barrel is connected by a flexible tube 22, preferably to the upper portion of a liquid containing tank 23, which is adapted to be carried on the operator's shoulder by a suitable strap, not shown, or otherwise. A flexible hose or liquid delivery tube 24 connects the lower portion of the tank 23 to the annular liquid chamber 13 of the spraying head.

The outer end of the valve stem 17 is shown as provided with a groove 25 that is engaged by the upper end of a short arm 26 secured to a valve actuating lever 27 shown as pivoted to the strut 20. Secured on the pump barrel is a latch lug or segment 28 having two shoulders adapted to be engaged by the free end of a latch spring 29 secured to the said lever 27. The lever 27 lies in such position that it is adapted to be engaged and operated by the fingers of the hand used to hold the pump barrel and to direct the spraying head to its work.

As is evident, when the piston of the pump is reciprocated, air will be delivered into the barrel chamber $b$ and from thence through the tube 22 into the liquid containing tank 23. Normally, the discharge orifice 15 of the spraying nozzle will be closed for the primary valve 16 and neither air nor the liquid from the tank will be discharged. In such position of the valve, the free end of the spring 29 will rest on the extreme upper portion of the lock lug 28. When the lever is moved so as to engage the free end of the latch spring 29 with the upper shoulder of the lock lug 28, the controlling valve will be set in the position shown in Fig. 2. In this position of the controlling valve, the primary valve 16 opens the discharge orifice 15, but the secondary valve 18 still cuts off the supply of air from the interior of the casing 9 directly to the chamber $c$ and discharge orifice 15; and at such time, the liquid will be forced by air pressure from the tank 23 and discharged in a spray from the orifice 15 of the spraying nozzle. For certain kinds of work, and especially when an extremely large spray is not required, the action described is just what is desired. When a stronger or larger spray is desired, the lever 27 is moved into position to engage the free end of the latch spring 29 with the second or lowermost shoulder of the lock lug 28, and the controlling valve will then be set in the position shown in Fig. 3. In this position of the controlling valve, the primary valve 16 moves farther away from and further opens up the discharge orifice 15 and the secondary valve 18 is moved out of the cylindrical portion 11 of the cap 10, thereby permitting a discharge of air directly from the interior of the casing 9 through the chamber 6 to the discharge orifice 15. When this takes place, the liquid will, by the air pressure which is maintained in the tank 23, be delivered from the said tank, through the tube 24, the chamber 13, passages 14 and chamber $c$ to and through the discharge orifice 15, but at the same time, the air delivered directly from the casing 9 into the chamber $c$ will commingle with the liquid in the latter noted chamber and will be discharged therewith through the orifice 15, thereby producing a very large and finely diffused and far-reaching spray.

What I claim is:

1. In a spraying device, a spraying head having a discharge orifice, a liquid chamber and an air chamber, of a primary and secondary valve working in the said spraying head, means for holding the said valve set in three positions, in one position the said primary valve serving to close the said discharge orifice, in another position said primary valve serving to open communication between said liquid chamber and said discharge orifice while said secondary valve cuts off communication between said air chamber and discharge orifice, and in the third position, the said primary valve serving to open communication between said liquid chamber and discharge orifice and the said secondary valve serving to open communication between said air chamber and discharge orifice, substantially as described.

2. In a liquid spraying device, a spraying head having a discharge orifice, a piston valve seat in communication with said discharge orifice, a liquid chamber in communication with said piston valve seat, and an air chamber normally connected to said piston valve seat, of a primary plunger valve normally closing said discharge orifice and provided with a secondary piston valve normally closing said piston valve seat, and the relation of said primary and secondary valves being such that the former may be moved to open said discharge orifice while said secondary valve closes said piston valve seat, the said two valves may be moved into a position to simultaneously connect said liquid and air chambers to the said discharge orifice, and means for holding said primary and secondary valves, in said positions, substantially as described.

In testimony whereof I affix my signature in presence of two witnesses.

PETER BRANDT.

Witnesses:
ALICE V. SWANSON,
HARRY D. KILGORE.